Feb. 7, 1928.
O. M. WALRATH
SPARE TIRE CARRIER
Filed Oct. 22, 1924
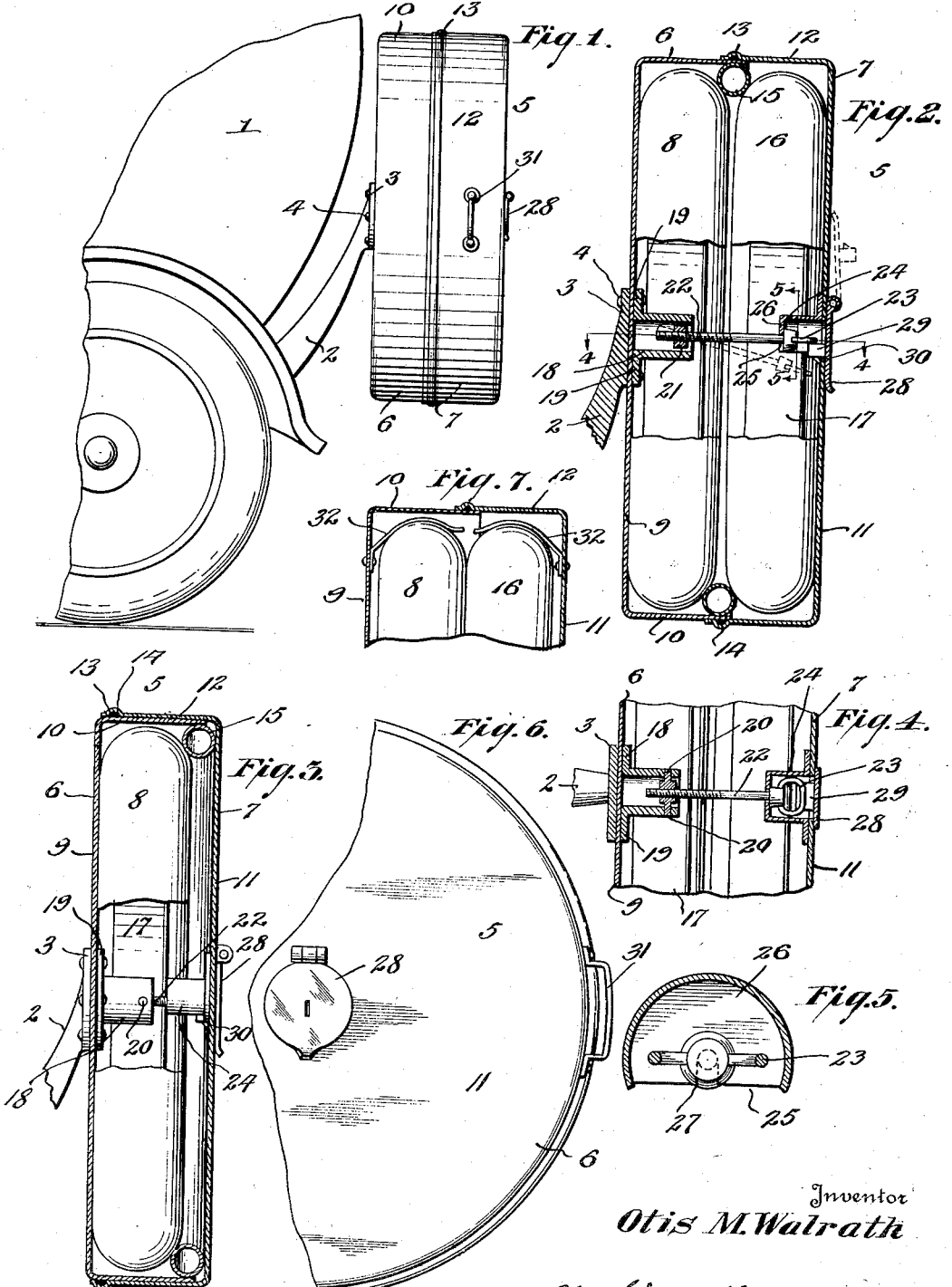
Inventor
Otis M. Walrath
By N. S. McDowell
Attorney Patented Feb. 7, 1928.

1,658,696

UNITED STATES PATENT OFFICE.

OTIS M. WALRATH, OF HANOVER, OHIO.

SPARE-TIRE CARRIER.

Application filed October 22, 1924. Serial No. 745,083.

This invention relates to an improved spare tire carrier for motor vehicles, and has for its object the provision of a carrier in the form of a casing consisting of relatively separable sections which are capable of supporting and retaining one or more spare tires in such manner that the latter will be completely protected from the deteriorating effects of the elements and yet will be accessible and readily removed from the carrier when such tires are needed.

Another object of the invention resides in the provision of a carrier of the character indicated in which the casing is of telescopic construction so as to adapt the casing to the retention of one or more tires without involving any structural addition or change in the construction of the casing itself.

A further object rests in the provision of a casing capable of securely retaining therein the tires, the rims upon which the tires are mounted, and if desired, the entire wheel structure, provision also being made for locking the casing in its closed position to prevent theft of its contents.

Further objects rest in providing a casing for the purpose set forth which will be substantial, durable and economical in construction and manufacture and which will present a neat and attractive appearance upon the vehicle with which it is associated.

Other objects will be in part obvious and in part pointed out hereinafter.

For a further understanding of the invention reference is to be had to the following description and to the accompanying drawings, wherein:

Figure 1 is a side elevation of the improved tire carrier comprising the present invention and illustrating the application of the same to the rear of a motor vehicle, Figure 2 is a vertical transverse sectional view taken through the carrier showing the same in the extended position which the same occupies when supporting a plurality of tires, Figure 3 is a similar view showing the carrier in its collapsed position when employed in connection with a single tire, Figure 4 is a transverse horizontal sectional view taken on the line 4—4 of Figure 2, Figure 5 is a vertical section taken on the line 5—5 of Figure 2, Figure 6 is a rear elevation of the carrier, and Figure 7 is a detail sectional view showing a slightly modified form of the invention.

Referring more particularly to the drawings the numeral 1 designates a motor vehicle. The vehicle in this instance has been shown as including a rigid bracket 2 which arises from the rear portion of the frame of the vehicle and is provided with an enlarged head 3 at its upper end, which is riveted or otherwise secured as at 4 to the tire carrier 5 comprising the present invention. In this instance the carrier is supported by the bracket 2 at the rear of the vehicle, although it is not necessary that the carrier should be used in this single position, as it is obvious that the same may be placed at any other convenient position on a motor vehicle and employed with equal effectiveness.

My improved carrier consists essentially of relatively movable sections 6 and 7, the former, for convenience in description, being termed the base section and the latter the cover section. These sections when together comprise a hollow casing forming an internal annular compartment for the reception of one or more spare tires 8.

The base section 6 is preferably formed from sheet metal and includes a rear wall 9 which terminates in an outwardly projecting annular flange 10, the depth of which, as shown in Figures 2 and 3 slightly exceeds the width of a single tire adapted to be carried therein. Similarly, the cover section 7 is formed from sheet metal and includes a front wall 11 and a rearwardly directed annular flange 12, which is so positioned, in relation to the base section 6, that the flange 10 will fit telescopically within the flange 12, or vice versa as the case may be. The inner extremity of the flange 12 is formed in this instance with an annular bead 13, which receives a gasket ring 14, for the purpose of sealing the casing to prevent the entrance of water into the compartment carrying the tires.

As shown in Figure 3, when a single tire is mounted in the casing, I employ an annular tube 15 of suitable flexible material. This tube encloses the perimeter of the tire 16 situated within the casing, and by tightening the cover section 7 in frictional engagement with the tube 15, the latter will be forced against the tire 16 so as to hold said tire against jostle and movement when arranged within the casing. It will of course be understood that the tire 16 carries the usual rim 17 by means of which it is demountably secured in connection with a motor vehicle wheel. However, the casing is so constructed that the entire wheel structure may if desired be placed within the casing and supported therein. This is particularly convenient when the carrier is used in connection with wire spoked wheels or wherein the so called disk wheel is employed.

In order to secure the sections 6 and 7 of the carrier together, the rear or base section 6 is provided with an axially located tubular casting 18, provided with an enlarged flange 19 by means of which it is secured to the section 6 and also to the head 3 of the bracket 2. This may be accomplished by means of the rivets or other fastening devices 4. Pivotally mounted within the casting 18 upon transversely extending trunnions 20 is a threaded nut 21, which carries an axially extending screw 22, which has its outer end provided with a hand engaging portion 23 by means of which the screw may be manually manipulated. It is of course within the scope of the invention to shape the portion 23 in the form of a nut, so that the latter may be manipulated by any suitable tool designed for that purpose.

The headed end 23 of the screw 22 is received within a housing 24 rigidly attached to the inner axial portion of the cover section 7, and the lower portion of this housing is cut away as at 25, the rear wall 26 thereof being slotted as at 27 for the reception of the shank portion of the screw 22. It will be seen that when the screw is positioned as shown in Figure 2 and is rotated, the same will frictionally engage with the wall 26 of the housing 24, so as to draw the two sections of the casing together, and thereby imparting sufficient frictional pressure upon the tire or tires retained therein to hold such tires securely against movement and to prevent the sections from becoming accidentally separated. When a plurality of tires are retained within the casing, as shown in Figure 2, the tube 15 is situated between said tires and assists materially in preventing undue movement of the tires within the casing.

To lock the casing sections together, and at the same time to provide protection against theft, I provide the upper wall of the cover section with a pivoted cover plate 28, which carries a key operated lock mechanism 29, which includes a movable locking bar 30 arranged for engagement with the wall 11 of the cover section 7. It will be observed, upon reference to Figure 2, that when the cover plate 28 assumes its normal position, and the latch bar 30 projected into locking engagement with the wall 11, that said locking mechanism will engage with the handle portion 23 of the screw 22. This prevents rotation of said screw and thereby prevents the sections of the casing from being relatively separated when the locking mechanism is active. However, to remove a tire from the casing it is merely necessary to unlatch the bar 30, allowing the plate 28 to swing to the open position shown in dotted lines in Figure 2. This provides complete access to the manipulating portion of the screw 22, enabling the latter to be rotated so as to release its frictional engagement with the housing 24. When this is accomplished the screw is permitted to drop down to assume the dotted line position shown in Figure 2 so that it is free or independent of the housing 24. When the screw is thus positioned the sections of the casing may be separated so as to provide access to the tire or tires therein retained. Handle bars 31 are provided on the cover section to assist in its support and manipulation.

In lieu of the tube 15 it is possible to employ leaf springs 32, which are mounted within the carrier sections and resiliently engage with the tires so as to prevent the latter from moving unduly. Moreover, the springs 32 have the advantage of being permanently carried by the casing sections and will not become misplaced or lost.

In view of the foregoing description, taken in connection with the accompanying drawings, it will be seen that the present invention provides an efficient, durable and attractive spare tire carrier for motor vehicles, which will serve to adequately protect spare tires from the deteriorating influence of the atmosphere and exposure to light and moisture. By its construction the casing or carrier is adapted to retain one or more tires without involving any structural alteration or addition in the casing itself. It will be observed that the present invention provides a tire casing which is inherently capable of supporting one or more tires and wherein no change whatever is necessary to permit of the attainment of this end. This is in contradistinction to certain prior types of carriers which must be built up in order to receive two or more tires.

What is claimed is:

1. In a spare tire carrier, a casing including separable rear and front sections formed to comprise a tire receiving chamber, a pivotally mounted nut carried by said rear section and disposed within said chamber, a housing carried by said front section and arranged within said chamber in alignment with said nut, and a connecting screw having the headed end thereof positioned within said housing and the threaded shank thereof secured to said nut, said screw being constantly carried by said nut and capable of swinging into and out of engagement with said housing.

2. In a spare tire carrier, a casing formed to include separable rear and front sections, said sections being formed internally to provide a tire receiving chamber, means for securing said sections together, comprising a threaded body pivotally connected with said rear section and disposed within said chamber, a longitudinally extending screw having the threaded shank portion thereof received by said nut, the outer end of said screw being provided with an actuating head, and a housing secured to said front section and arranged axially within said chamber, the lower portion of said housing being provided with an opening for the reception of the head of said screw, a cover plate pivotally carried by the front section, and a locking means carried by said cover plate, said locking means engaging with the headed end of said screw for restraining the latter against rotation.

In testimony whereof I affix my signature.

OTIS M. WALRATH.